United States Patent [19]

Cytanovich

[11] 4,007,548

[45] Feb. 15, 1977

[54] METHOD OF TEACHING READING

[76] Inventor: Kathryn Frances Cytanovich, 230 California Ave., Suite 109, Palo Alto, Calif. 94306

[22] Filed: Jan. 31, 1975

[21] Appl. No.: 546,029

[52] U.S. Cl. .............................................. 35/35 R
[51] Int. Cl.² ..................................... G09B 17/00
[58] Field of Search ............ 35/35 R, 35 E; 283/45, 283/46

[56] References Cited

UNITED STATES PATENTS 683,267  9/1901  Froelich ............................. 283/46

FOREIGN PATENTS OR APPLICATIONS 283,759  1/1928  United Kingdom ................ 35/35 E

OTHER PUBLICATIONS

See and Say Series, Book 2; by Sarah Arnold et al., C. 1920, Iroquois Publishing Co., Syracuse, N. Y. p. 57.
Websters Seventh New Collegiate Dictionary, Inside Front and Back Covers.
Report and Evaluation of an Experimental and Demonstration Project in Basic Education, Pre-vocational Training; Nov. 22, 1970, Glossa and Hillman pp. 38, 39 Title and Letter Pages.

*Primary Examiner*—William H. Grieb
*Attorney, Agent, or Firm*—Limbach, Limbach & Sutton

[57] ABSTRACT

A method of teaching reading by presenting words in an orthography consisting of standard type having letters associated with each sound sequentially in a syllable and symbols to indicate each of the vowel sounds. Children and poor readers learn more rapidly with a minimum of supervision.

13 Claims, 2 Drawing Figures

SHORT VOWEL SOUNDS:

apple 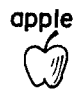 elephant 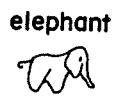 indian 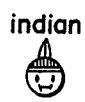 octopus    umbrella

LONG VOWEL SOUNDS:

A      E      I      O      U

OTHER SYMBOLS:

moon    house    car    nurse 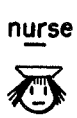 book 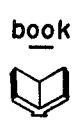

boy 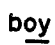 saw 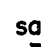 or 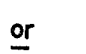 all 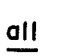

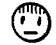 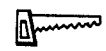 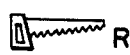 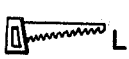

thumb 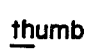 ship 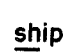 cherry 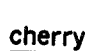 when

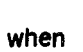

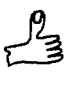 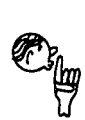 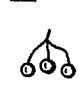 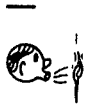

FIG. 1

SHORT VOWEL SOUNDS:

apple   elephant   indian   octopus   umbrella

LONG VOWEL SOUNDS:

A   E   I   O   U

OTHER SYMBOLS:

moon   house   car   nurse   book boy   saw   or   all thumb   ship   cherry   when

FIG. 2

1 2
on 1 2
no
o 1 2 3 4   1 2 3   1 2 3   1 2   1 2 3
fruit   blue   blew   you   th r ough 1 2 3   1 2 3   1 2 3   1 2
cake   pail   tray   weigh
A   A   A   A 1 2 1 2 3
doing 1 2 3 1 2 1 2 3 1 2 1 23
misinterpretation

METHOD OF TEACHING READING

BACKGROUND OF THE INVENTION

A great deal of attention has been focused in recent years upon the reading abilities of children. While a variety of socio-economic and linguistic theories have been advanced, the attention devoted to the mechanics of learning to read has been inadequate to develop a system understandable by children with reading disabilities. A suprisingly common problem with children learning to read is dyslexia. The dyslexic child does not understand the orientation or directionality of a letter, so that the letter *d* is confused with the letter *b*. Similarly, an entire word is sometimes reversed in orientation, so that "on" is confused with "no". While the present invention is not limited to teaching reading to dyslexic children, it has been found that difficulties with orientation and directionality of words are common in learning to read. Related to this is a failure to recognize letters, which is known in the trade as a problem of graphic symbol differentiation. Also, many readers fail to perceive the length of a word or the number of letters forming it, which leads to a misinterpretation of the word by the omission of a part of it. Also, it is commonplace for a reader with a learning or reading disability to transpose the sequential arrangement of the letters in a word.

The association of sounds with letters within the word itself is greatly facilitated by using pictorial symbols within the orthography. Sound association is a normal process in learning to read, but traditional reading techniques do not provide for facilitating the association of sounds of letters within words. The failure to associate sounds adequately is related to the problem of insufficient recall of words from a vocabulary, word analysis, and a narrow sight vocabulary. Many orthographics have been developed over the years, but often they substitute different letters than the ones actually appearing in the word to facilitate pronunciation and recall. However, these orthographics do not resolve the directionality and sequence problems, and leave the student to learn the word in the form actually printed in texts outside the orthography. Also, existing orthographies do not include the clues to sounds immediately associated with the letters to be sounded, but require recall of the clues from the letters.

SUMMARY OF THE INVENTION AND OBJECTS

The present invention relates to a method of teaching reading by use of an orthography which includes the words in standard type, symbols associated with the vowel phonemes and digraphs in the reading material, and, preferably, a numerical direction-giving and sequencing aid. The aids provide for much more rapid learning of reading.

It is an object of the present invention to provide a system for learning to read which is easily learned and easily taught.

It is a further object of the present invention to provide a system for learning to read which does not require expensive equipment, skilled teachers, or extensive time demands.

It is a further object of the present invention to provide a system which can be learned by even beginning students in approximately half an hour and which permits the student to comprehend the progress he is making towards learning to read while enjoying it.

BRIEF DESCRIPTION OF THE DRAWING

FIG. 1 is a chart illustrating appropriate symbols to be used to suggest the sounds the student will need to know.

FIG. 2 is a word list illustrating how the present invention is incorporated into text.

DESCRIPTION OF THE PREFERRED EMBODIMENT

As shown in FIG. 1, appropriate symbols may be used to indicate the vowel phonemes and the consonant digraphs. The symbols shown have been found to be suitable in teaching children to read, but other symbols may be used for persons of different ages and backgrounds. For example, when teaching adults familiar with woodworking tools to read, appropriate symbols can be developed using illustrations of various tools and implements having names which illustrate the sounds desired. Likewise, other symbols can be used to fit the prospective reader's cultural background.

Even very young readers can understand in a relatively short period of time that in every instance where the symbol of an apple appears, the short vowel sound of the letter *a* as it appears in that word is to be pronounced. Similarly, the sounds in the words "elephant", "Indian", "octopus", and "umbrella" are all generally known to children in this country. I have found most children grasp the symbols of FIG. 1 readily and are able to read with the orthography within 30 minutes.

Children also learn to state the letters of the alphabet at an early age. Those letters are invariably pronounced with the long vowel sound, so that the use of the capital letter to symbolize the long vowel sounds is readily comprehended by children. No pictorial symbols are necessary for the long vowel sounds, in my experience.

The symbol of a "saw" is useful in a number of contexts since the sound varies slightly depending upon the succeeding consonants. As shown in FIG. 1, when appearing alone the symbol of a saw depicts the vowel sound of that word. However, when the capital letter R appears in juxtaposition with the symbol, the sound resembles the combination "or". Similarly, when the saw is used in conjunction with the capital letter L, the vowel sound resembles that in the word "all".

Also shown in FIG. 1, the consonant digraphs are simply illustrated pictorially. The sound "th" is represented by a person sticking out his thumb. It is recognized that the letters th are somewhat different in the words "thumb" and "this", but the refinement is readily learned after the fundamentals of reading according to the present invention are learned. The symbol for the letters "sh" is a person holding his index finger to his lips. A cluster of cherries illustrates the sound "ch". A person blowing out a candle is the symbol used to suggest the sound of the letters "wh". Other than these consonant digraphs, consonant sounds are easily mastered by students. Only with very beginning students is it necessary to use consonant symbols in the orthography. While such symbols are contemplated within the present invention, the vowel phonemes are the nub of the difficulty in sound association in the reading process.

FIG. 2 illustrates how the orthography is used in various words. Directionality, sequencing and syllabication are facilitated by the present invention. For example, the words on and no are often confused. In the present orthography, the words appear as shown in FIG. 2. The student understands that the vowel sound is the same as the word octopus in the word on. In addition, he understands that the first sound is that of octopus and that the second sound is the letter n. Conversely, for the word no the student can readily understand that the vowel sound is the same as the capital letter O and that the initial sound is that of the consonant n.

As shown in FIG. 2, the numbers above the word "fruit" illustrate that there are four separate sounds. The underscoring of the letters u and i shows that the two letters are to be sounded together as a single sound. The sound associated with the vowels is pictorially illustrated by the representation of a moon beneath them.

The decoding which always takes place in the reading process is facilitated by the present invention in that the student will understand that the sound f precedes the sound r and that the sounds oo and t follow to form the word. Ordinarily, underscoring is limited to two letters, except in those instances where silent letters are added to a vowel sound, such as "through" and "weigh".

The problem of omission of parts of a word is resolved by the present invention in that each syllable is numbered separately. Referring to FIG. 2, the word "misinterpretation" has the number one written six times, indicating that there are six syllables in the word. The numbers within each syllable indicate the number of sounds: three sounds in the first syllable, two in the second, etc. The pictorial illustrations assist in the understanding of the vowel phonemes and digraphs.

The system of the present invention has been used experimentally for some time with considerable success. Using the Stanford Diagnostic Reading Test, it was found that an overall average gain of 2.3 grade equivalents was observed for students having participated in the system for an average of 12.2 weeks. Five hours is considered a week of reading instruction, since the normal process is to spend one hour per day for five days in a week. The observed grade equivalent gains tended to increase as expected with the increasing grade level. The observed mean gains ranged from 1.5 grade equivalent for grade one students enrolled in the program for an average of 9.1 weeks to 3.7 grade equivalents for grade 11 students enrolled for an average of 13.6 weeks. In the particular study herein described, at all grade levels the pre-test scores averaged 0.8 grade equivalents below grade level.

In using my system of orthography, I have found it convenient to encode 7,000 of the most commonly used words for beginning readers. The words are written in any standard type font at one location on a paper and in the orthography of the present invention in a visually separable location on the paper. Conveniently, the words may be placed in standard type on the obverse of a sheet and in the orthography on the reverse. In this way, the reader may test his ability to read a word in normal type first and then, if not properly done, to turn the sheet over to sound it out with the orthography of this invention.

It is also helpful to have a handy index to the word list. This may be accomplished by placing a single word on a card (front and back), with four cards placed in a single Kardex holder, together with a sufficient number of duplicates to permit distribution to students. The Kardex file system is widely used in business and is readily available commercially. The four cards in each holder are color coded with a different color, so that each card may be readily differentiated. Each Kardex drawer, less than 1 inch high, holds approximately 70 card holders with four cards each. Consequently, a stack of Kardex files, holding about 13 drawers can accommodate a word list of 3,640. Two such stacks are adequate to permit a word list of 7,000 words, suitable through grade 10.

When a student becomes familiar with the system, he need not be dependent upon the orthography described. That is to say, he does his decoding mentally, without reliance upon the aid described. However, where needed, the aids can be readily provided. For example, a pupil familiar with the system may read from the daily newspaper. When he finds a word that he fails to properly read aloud, the word is designated and at the end of the reading lesson all of the designated words are selected from the word list. Photocopies of the designated words are provided to the student so that he can take them home and study them using the orthography of the present invention. The sequencing and pictorial aids not only help the student to remember the word, they help him understand what part was omitted, what part was mispronounced, or what other problem caused the designation of the word.

It will be seen that a system of orthography using only about 20 pictorial symbols to indicate the sounds associated with vowel phonemes and digraphs and simple numbering of sounds and syllables can provide a simple, low-cost, effective way to teach people to read. While the preferred reading aid consists of symbols, numbers and connecting markings, the latter two may be dropped in certain situations, as with adults who tend to have less difficulty with directionality and sequencing. The placing of symbols associated directly in the orthography with the letters to be pronounced is the essential feature of the invention. The combination of numbers and symbols with the printed word has proved to be highly effective, but the use of the symbols alone provides some improvement in the ability to read. If symbols are used without numbering, it is desirable to increase the number of symbols to cover other variations in sounds.

I claim:
1. In a method of teaching reading, the steps of
  1. presenting the student with material to be read in an orthography consisting of:
    a. the words to be read in standard type;
    b. symbols representing the sounds of vowel phonemes and consonant digraphs appearing in the material proximately located to the phonemes and digraphs to assist in pronouncing the sounds,
    c. markings to designate combined letters forming a single sound, and
    d. numerical designations in directional sequence of each sound in each word, and
  2. sequencing the sounds of each syllable in the direction of increasing numbers.

2. A method as in claim 1 wherein the symbols associated with the standard type consist of representations signifying (a) the short vowel sounds, (b) the long vowel sounds, and (c) the vowel sound associated in English with "moon", "house", "car", "nurse", "book", "saw", "or", "all", and "boy".

3. A method as in claim 2 wherein the representations signifying the short vowel sounds are an apple, an elephant, an Indian, an octopus and an umbrella.

4. A method as in claim 1 wherein the symbols associated with digraphs consist of representations signifying "th", "sh", "ch" and "wh".

5. A method as in claim 1 wherein each of the words in the material presented is selected from a word list in which the word is printed in a first location in standard type and in a second location, visually separable from the first, in the orthography defined in claim 1.

6. A method as in claim 5 wherein the word list is numerically indexed and color-coded for reading selection of the desired word.

7. A method as in claim 5 wherein the designated words are given to the student on a sheet having the designated words in standard type on one side and in the orthography of Claim 1 on the reverse.

8. A method as in claim 1 wherein any word improperly read by the student is designated for repetition to enhance learning.

9. A method as in claim 1 wherein the orthography also includes symbols associated with consonant sounds.

10. An article of manufacture to aid beginning readers comprising a printing medium bearing
   1. one or more words to be read in ordinary characters of the alphabet,
   2. a symbol proximately located to each vowel phoneme in each word to suggest the sound of the phoneme,
   3. a mark associating each series of letters pronounced as a single sound, and
   4. numbers adjacent each letter or letters forming a single sound, the numbers beginning anew with each syllable and increasing in the direction of sound sequencing for proper pronounciation.

11. An article as in claim 10 in which each consonant digraph of each word is symbollically illustrated to suggest its sound.

12. An article as in claim 10 in which the symbol suggesting the sound appears beneath the word, the numerical designation of sounds is in sequential arabic numerals above each letter or series of letters forming a sound commencing with 1 at the first sound of each symbol, and the mark associating each series of commonly pronounced letters is underscoring.

13. An article as in claim 10 in which the orthography described appears at one location on the printing medium and the same word or words appears in a standard type font in a visually separable location on the medium, whereby the reader may first look at the words in standard type without looking at the separated orthography and, if not properly read, then observe the orthography.

* * * * *